(12) United States Patent
Lv et al.

(10) Patent No.: US 9,697,819 B2
(45) Date of Patent: Jul. 4, 2017

(54) METHOD FOR BUILDING A SPEECH FEATURE LIBRARY, AND METHOD, APPARATUS, DEVICE, AND COMPUTER READABLE STORAGE MEDIA FOR SPEECH SYNTHESIS

(71) Applicant: Baidu Online Network Technology (Beijing) Co., Ltd., Beijing (CN)

(72) Inventors: Wenyu Lv, Beijing (CN); Daolong Wang, Beijing (CN); Meng Liu, Beijing (CN)

(73) Assignee: Baidu Online Network Technology (Beijing) Co., Ltd. (CN)

( * ) Notice: Subject to any disclaimer, the term of this patent is extended or adjusted under 35 U.S.C. 154(b) by 0 days.

(21) Appl. No.: 14/966,144

(22) Filed: Dec. 11, 2015

(65) Prior Publication Data

US 2017/0004820 A1    Jan. 5, 2017

(30) Foreign Application Priority Data

Jun. 30, 2015    (CN) .......................... 2015 1 0375429

(51) Int. Cl.
| | |
|---|---|
| *G10L 13/00* | (2006.01) |
| *G10L 13/08* | (2013.01) |
| *G10L 13/027* | (2013.01) |
| *G10L 13/02* | (2013.01) |
| *G06F 17/27* | (2006.01) |
| *G10L 13/047* | (2013.01) |

(Continued)

(52) U.S. Cl.
CPC ........ *G10L 13/027* (2013.01); *G06F 17/2785* (2013.01); *G10L 13/02* (2013.01); *G10L 13/047* (2013.01); *G10L 15/26* (2013.01); *G10L 13/033* (2013.01)

(58) Field of Classification Search
CPC ......... G10L 13/00; G10L 13/02; G10L 13/04; G10L 13/08
See application file for complete search history.

(56) References Cited

U.S. PATENT DOCUMENTS 6,801,931 B1 * 10/2004 Ramesh ............... G06Q 10/107
                                                                704/260
7,277,855 B1 * 10/2007 Acker .................... G10L 13/02
                                                                704/260
(Continued)

*Primary Examiner* — Jialong He
(74) *Attorney, Agent, or Firm* — Blank Rome LLP

(57) ABSTRACT

The present invention provides a method for building a speech feature library, as well as a method, an apparatus, a device and corresponding non-volatile, non-transitory computer readable storage media for speech synthesis. Because the speech feature library used in the present invention saves at least one context corresponding to each piece of personalized textual information and at least one piece of textual information semantically identical to the personalized textual information, when performing speech synthesis, even if the provided textual information is not personalized textual information corresponding to the desired personalized speech, personalized textual information semantically identical to the textual information to be subject to speech synthesis may be first found in the speech feature library to thereby achieve personalized speech synthesis, such that use of the personalized speech will not be restricted by aging, sickness, and death of a person.

7 Claims, 4 Drawing Sheets

(51) Int. Cl.
*G10L 15/26* (2006.01)
*G10L 13/033* (2013.01)

(56) References Cited

U.S. PATENT DOCUMENTS

| | | | | |
|---|---|---|---|---|
| 2002/0120450 | A1* | 8/2002 | Junqua | G10L 13/04 704/258 |
| 2002/0173962 | A1* | 11/2002 | Tang | G10L 13/033 704/260 |
| 2005/0203743 | A1* | 9/2005 | Hain | G10L 13/033 704/258 |
| 2006/0095265 | A1* | 5/2006 | Chu | G10L 13/033 704/268 |
| 2006/0210028 | A1* | 9/2006 | Ng | H04M 1/72552 379/88.14 |
| 2008/0235024 | A1* | 9/2008 | Goldberg | G10L 13/033 704/260 |
| 2009/0006096 | A1* | 1/2009 | Li | G10L 13/08 704/260 |
| 2009/0313018 | A1* | 12/2009 | Degani | G10L 15/06 704/250 |
| 2010/0250254 | A1 | 9/2010 | Mizutani | |
| 2011/0165912 | A1* | 7/2011 | Wang | G10L 13/033 455/563 |
| 2014/0122079 | A1* | 5/2014 | Kaszczuk | G10L 13/02 704/260 |
| 2016/0210960 | A1* | 7/2016 | Kim | H04W 4/14 |

* cited by examiner

METHOD FOR BUILDING A SPEECH FEATURE LIBRARY, AND METHOD, APPARATUS, DEVICE, AND COMPUTER READABLE STORAGE MEDIA FOR SPEECH SYNTHESIS

CROSS-REFERENCE TO RELATED APPLICATIONS

This application claims priority to Chinese Invention Application No. 201510375429.3, filed on Jun. 30, 2015, titled "Method for Building a Speech Feature Library, Method, Apparatus, and Device for Speech Synthesis", which is entirely incorporated herein by reference.

FIELD OF THE INVENTION

The present invention relates to the field of computers, and more specifically, to a method for building a speech feature library, as well as methods, apparatuses, devices and computer readable storage media for speech synthesis.

BACKGROUND OF THE INVENTION

Personalized speech is often used to impress audiences. For example, speech actors are convincing to audiences through their personalized speeches when they dub for actors in films and TV dramas. However, at present, dubbing or singing for films and TV dramas require real people to act. As men get old, sick or die, personalized speeches of these men disappear.

It is a problem to be solved as to how to make use of personalized speech not limited by aging, sickness and death of men.

SUMMARY OF THE INVENTION

One of the technical problems being solved by the present invention is building a personalized speech feature library so as to achieve a personalized speech synthesis based thereupon. In this way, use of personalized speeches will not be limited by aging, sickness and death of men.

According to one embodiment of a first aspect of the present invention, there is provided a method for building a speech feature library, comprising:

converting speech recording of an object into personalized textual information;

analyzing and obtaining at least one context corresponding to each piece of personalized textual information and at least one semantically identical piece of textual information;

saving, in a speech feature library of the object, each piece of personalized textual information and a corresponding linguistic feature, each linguistic feature indicating a context and a piece of textural information that correspond;

performing audio sampling to the speech recording to obtain an audio sample value; and saving an audio feature in the speech feature library of the object, the audio feature indicating an audio sample value.

According to one embodiment of a second aspect of the present invention, there is provided an apparatus for building a speech feature library, comprising:

a module configured to convert speech recording of an object into personalized textual information;

a module configured to analyze and obtain at least one context corresponding to each piece of personalized textual information and at least one semantically identical piece of textual information;

a module configured to save, in a speech feature library of the object, each piece of personalized textual information and a corresponding linguistic feature, each linguistic feature indicating a context and a piece of textural information that correspond;

a module configured to perform audio sampling to the speech recording to obtain an audio sample value; and a module configured to save an audio feature in the speech feature library of the object, the audio feature indicating an audio sample value.

According to one embodiment of a third aspect of the present invention, there is further provided a computer device which comprises an apparatus for building a speech feature library described above.

Because the present invention needs to consider scenario information of a user and the user's profile when recommending candidate recommendation items so as to build a speech feature library, for each piece of personalized textual information, at least one context and at least one piece of textual information semantically identical to the piece of personalized textual information will be determined. In subsequent speech synthesis, even the provided textual information is not personalized textual information corresponding to the desired personalized speech, the personalized textual information semantically identical to the textual information that needs to be subject to speech synthesis may be first looked up in the speech feature, and then achieving personalized speech synthesis, such that use of the personalized speech will not be restricted by aging, sickness, and death of a person.

A second one of technical problems being solved by the present invention is performing personalized speech synthesis, such that use of the personalized speech will not be restricted by aging, sickness, and death of a person.

According to one embodiment of a fourth aspect of the present invention, there is provided a method for speech synthesis, comprising:

analyzing and obtaining a context for textual information to be subject to speech synthesis;

generating a linguistic feature for the textual information to be subject to speech synthesis, to indicate the textual information to be subject to speech synthesis and its context;

looking up, in a speech feature library, a linguistic feature matching the linguistic feature corresponding to the textual information to be subject to speech synthesis, each piece of linguistic features corresponding to each piece of personalized textual information in the speech feature library indicating a corresponding context and a piece of semantically identical textual information; and performing speech synthesis based on the context indicated by the found/looked-up linguistic feature, the personalized textual information corresponding to the linguistic feature, and an audio feature saved in the speech feature library, the audio feature indicating an audio sampling value.

According to one embodiment of a fifth aspect of the present invention, there is provided a speech synthesis apparatus, comprising:

a context analyzing module configured to analyze and obtain a context for textual information to be subject to speech synthesis;

a linguistic feature generating module configured to generate a linguistic feature for the textual information to be subject to speech synthesis, to indicate the textual information to be subject to speech synthesis and its context;

a linguistic feature matching module configured to look up, in a speech feature library, a linguistic feature matching the linguistic feature corresponding to the textual information to be subject to speech synthesis, each piece of linguistic features corresponding to each piece of personalized textual information in the speech feature library indicating a corresponding context and a piece of semantically identical textual information;

a speech synthesis module configured to perform speech synthesis based on the context indicated by the found/looked-up linguistic feature, the personalized textual information corresponding to the linguistic feature, and an audio feature saved in the speech feature library, the audio feature indicating an audio sampling value.

According to one embodiment of a sixth aspect of the present invention, there is further provided a computer device, comprising the speech synthesis module described above.

Because the speech feature library used in the present invention saves at least one context corresponding to each piece of personalized textual information and at least one piece of textual information semantically identical to the personalized textual information, when performing speech synthesis, even if the provided textual information is not personalized textual information corresponding to the desired personalized speech, personalized textual information semantically identical to the textual information to be subject to speech synthesis may be first found in the speech feature library to thereby achieve personalized speech synthesis, such that use of the personalized speech will not be restricted by aging, sickness, and death of a person.

According to one embodiment of a seventh aspect of the present invention, there is further provided a non-volatile, non-transitory computer readable storage media, storing computer code, when the computer code are executed, the following steps are performed: converting speech recording of an object into personalized textual information; analyzing and obtaining at least one context corresponding to each piece of personalized textual information and at least one semantically identical piece of textual information; saving, in a speech feature library of the object, each piece of personalized textual information and a corresponding linguistic feature in association, each linguistic feature indicating a context and a piece of textural information that correspond; performing audio sampling to the speech recording to obtain an audio sample value; and saving an audio feature in the speech feature library of the object, the audio feature indicating an audio sample value.

According to one embodiment of an eighth aspect of the present invention, there is further provided a non-volatile, non-transitory computer readable storage media, storing computer code, when the computer code are executed, the following steps are performed: analyzing and obtaining a context for textual information to be subject to speech synthesis; generating a linguistic feature for the textual information to be subject to speech synthesis, to indicate the textual information to be subject to speech synthesis and its context; looking up, in a speech feature library, a linguistic feature matching the linguistic feature corresponding to the textual information to be subject to speech synthesis, each piece of linguistic features corresponding to each piece of personalized textual information in the speech feature library indicating a corresponding context and a piece of semantically identical textual information; and performing speech synthesis based on the context indicated by the found/looked-up linguistic feature, the personalized textual information corresponding to the linguistic feature, and an audio feature saved in the speech feature library, the audio feature indicating an audio sampling value.

A person of normal skill in the art will appreciate that although the detailed description below refer to the illustrated embodiments and drawings, the present invention is not limited to these embodiments. Instead, the scope of the present invention is broad, and is intended to be limited by the appended claims.

BRIEF DESCRIPTION OF THE ACCOMPANYING DRAWINGS

Other features, objectives and advantages of the present invention will become more apparent through reading the detailed description of non-limiting embodiments with reference to the accompanying drawings.

In the accompanying drawings, same or like reference numerals represent same or like components.

DETAILED DESCRIPTION OF THE ACCOMPANYING DRAWINGS

Hereinafter, the present invention will be described in further detail with reference to the accompanying drawings.

Figure 1:
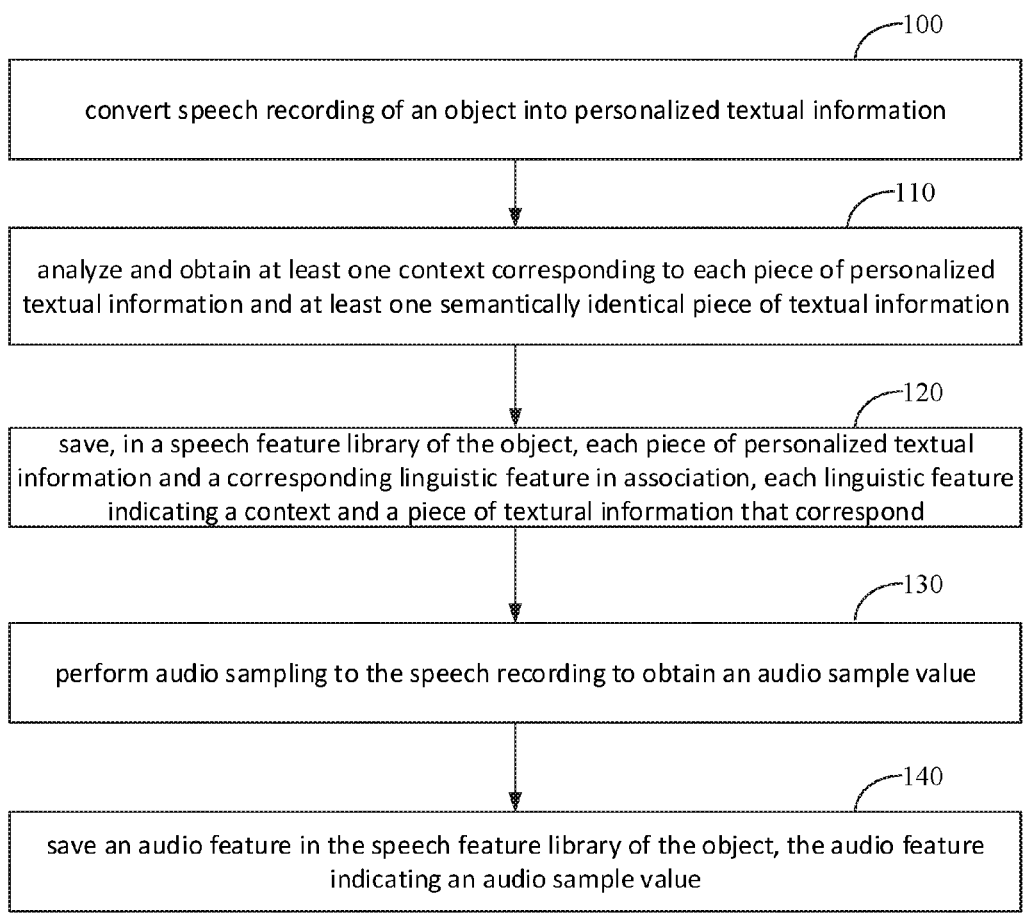
FIG. 1 shows a flow diagram of a method for building a speech feature library according to one embodiment of the present invention.

FIG. 1 shows a flow diagram of a method for building a speech feature library according to one embodiment of the present invention. The method according to the present invention is mainly implemented by an operating system or a processor control in a computer device. The operating system or processor controller is referred to as an apparatus for building a speech feature library. The computer device includes, but is not limited to, at least one of the following: a user equipment, a network device. The user equipment includes, but is not limited to, a computer, a smart phone, a PDA, etc. The network device, includes, but is not limited to, a single network server, a server group consisting of a plurality of network servers, or a cloud consisting of mass computers or network servers based on cloud computing, wherein the cloud computing a kind of distributed computation, a virtual super computer consisting of a group of loosely coupled computer sets.

As shown in FIG. 1, the method for building a speech feature library provided according to one embodiment of the present invention specifically comprises:

Step 100: converting speech recording of an object into personalized textual information.

Here, a segment of speech recording is recognized into corresponding textual information through a speech recognition technology, which is referred to as personalized textual information in the present invention.

Here, after the segment of speech recording is recognized into corresponding textual information, a plurality of pieces of textual information may be cut into a plurality of pieces of textual information.

For example, the textual information derived from recognizing a segment of speech recording is "曾经有一份真挚的爱情放在我面前 (a true love once before me) 我没有珍惜 didn't hold it dear) 等我失去的时候才追悔莫及 (only when I lost it, I regret so bitterly) 人世间最痛苦的事莫过于此 (what can be more painful in the world, this is the bitterest)." This segment of textual information may be cut into "曾经有一份真挚的爱情放在我面前 (a true love once before me)," "曾经有一份真挚的爱情 (a true love once)," "放在我面前 (before me)," "我没有珍惜 (I didn't hold it dear)," "等我失去的时候才追悔莫及 (only when I lost it, I regret so bitterly)," "人世间最痛苦的事莫过于此 (what can be more painful in the world, this is the bitterest)," "人世间最痛苦的事 (what can be more painful in the world)," "莫过于此 (this is the bitterest)," etc.

Step 110, analyzing and obtaining at least one context corresponding to each piece of personalized textual information and at least one semantically identical piece of textual information.

Here, there are a plurality of specific analysis manners, e.g., analyzing the context and semantics through mass data technology.

Here, a piece of personalized text information may correspond to one context or correspond to a plurality of contexts.

Here, a piece of personalized text information corresponds to one semantics. However, this semantics has a plurality of expressions, i.e., corresponding to a plurality of pieces of textual information. For example, the personalized textual information is "我没有珍惜 (I didn't hold it dear)." Other textual information semantically identical may be "我不珍惜 (I did not hold it dear)," "我没能珍惜 (I failed to hold it dear)," "偶没有珍惜 (a Chinese netizen slang for I) did not hold it dear)."

Step 120, saving, in a speech feature library of the object, each piece of personalized textual information and a corresponding linguistic feature in association, each linguistic feature indicating a context and a piece of textural information that correspond.

For example, analysis of the piece of personalized textual information "我没有珍惜 (I didn't hold it dear)" turns out into two contexts: statement, regret. analysis of the piece of personalized textual information "我没有珍惜 (I didn't hold it dear)" turns out into three pieces of textual information: "我不珍惜 (I did not hold it dear)," "我没能珍惜 (I failed to hold it dear)," "偶没有珍惜 (OU (a Chinese netizen slang for I) did not hold it dear)." Then, this personalized textual information "我没有珍惜 (I didn't hold it dear)" corresponds to 8 linguistic features, including a linguistic feature indicating the personalized textual information ""我没有珍惜 (I didn't hold it dear)."

The content of linguistic features may be the context and textual information it indicates, or identification information of the context and textual information it indicates, or a pointer of a storage location for the context and textual information it indicates, etc.

Step 130, performing audio sampling to the speech recording to obtain an audio sample value.

Here, the speech recording is sampled as to audio information reflecting a speech habit features such as vowels, consonants, tones, etc.

Here, for each piece of personalized textual information of the recording, a group of corresponding audio sampling values may be derived.

Step 140, saving an audio feature in the speech feature library of the object, the audio feature indicating an audio sample value.

In the present invention, the content of audio features may be the audio sampling value it indicates, or identification information of the audio sampling value it indicates, or a pointer of the storage location of the audio sampling value it indicates, etc.

Because the present invention needs to consider scenario information of a user and the user's profile when recommending candidate recommendation items so as to build a speech feature library, for each piece of personalized textual information, at least one context and at least one piece of textual information semantically identical to the piece of personalized textual information will be determined. In subsequent speech synthesis, even the provided textual information is not personalized textual information corresponding to the desired personalized speech, the personalized textual information semantically identical to the textual information that needs to be subject to speech synthesis may be first looked up in the speech feature, and then achieving personalized speech synthesis, such that use of the personalized speech will not be restricted by aging, sickness, and death of a person.

In the above embodiment of the present invention, in order to facilitate managing and looking up the speech feature library, speech features may also be saved. The speech feature corresponding to each piece of personalized textual information indicates a piece of linguistic feature and a piece of audio feature. Correspondingly, the speech feature corresponding to each piece of personalized textual information is also saved in the speech feature library, each piece of speech feature indicating a piece of linguistic feature and a piece of audio feature.

For example, the piece of personalized textual information "我没有珍惜 (I didn't hold it dear)" corresponds to 8 pieces of linguistic features mentioned above and also corresponds to an audio feature; then the 8 pieces of speech features corresponding to the personalized textual information are saved in the speech feature library of the object, each speech feature indicating a piece of linguistic feature corresponding to this piece of personalized textual information and its corresponding audio feature.

Based on any one of the embodiments of the method, each linguistic feature also indicates weights of the corresponding context and textual information in that piece of linguistic feature.

For example, a piece of linguistic feature corresponding to the piece of personalized textual information "我没有珍惜 (I didn't hold it dear)" is "statement," the indicated textual information is "我没有珍惜 (I didn't hold it dear)." This textual feature also indicates the weights of the context "statement" and the textual information "我没有珍惜 (I didn't hold it dear)" in this linguistic feature, respectively.

In the present invention, a value of an initial weight may be preset. For example, when generating a piece of linguistic feature, the weights for the indicated context and textual feature are set to 0.5, respectively.

On this basis, the specific implementation of the step 120 may comprise:

generating a linguistic feature corresponding to each piece of personalized textual information, and determining weights of the context and textual information indicated by each linguistic feature in the present linguistic feature;

if the context and textual information indicated by the linguistic feature as having been saved in the speech feature library of the object are identical to the context and textual information derived from analysis, but have different weights in the linguistic feature, merging the weights according to a predetermined rule.

For example, the generated context indicated by a piece of linguistic feature is "statement," having a weight of 0.5; the text information is "我没有珍惜(I didn't hold it dear)," having a weight of 0.5. A context indicated by a piece of linguistic feature as saved in the speech feature library of the object is "statement," having a weight of 0.4; while the textual information is "我没有珍惜(I didn't hold it dear)," having a weight of 0.6, then the weights are merged according to a predetermined rule (e.g., averaging) and then saved, i.e., modifying the saved weight of the context indicated by the piece of linguistic feature to 0.45, and modifying the weight of the textual information to 0.55.

If the linguistic features saved in the speech feature library have no items identical to both of the context and textual information indicated by the generated linguistic feature, then the generated linguistic feature is directly saved in the speech feature library.

Based on any of the above method embodiments, a specific implementation of the step 140 may comprise: if a difference between an audio sampling value indicated by the audio feature already saved in the speech feature library of the object and an audio sampling value derived from audio sampling is within a predetermined range, merging the audio sampling values.

For example, a different between an audio sampling value corresponding to the personalized textual information "我没有珍惜(I didn't hold it dear)" and a group of audio feature values saved in the speech feature library is within a predetermined range; so, the two groups of audio feature values are merged according to a predetermined rule (e.g., averaging) and then replace the originally saved group of audio feature values.

If the speech feature library of the object saves no audio sampling value indicated by the audio feature, whose difference from the audio sampling value derived from audio sampling is within a predetermined range, the audio sampling value derived from sampling is directly saved in the speech feature library.

Based on the same inventive concept as the above method, embodiments of the present invention further provide an apparatus for building a speech feature library.

Figure 2:
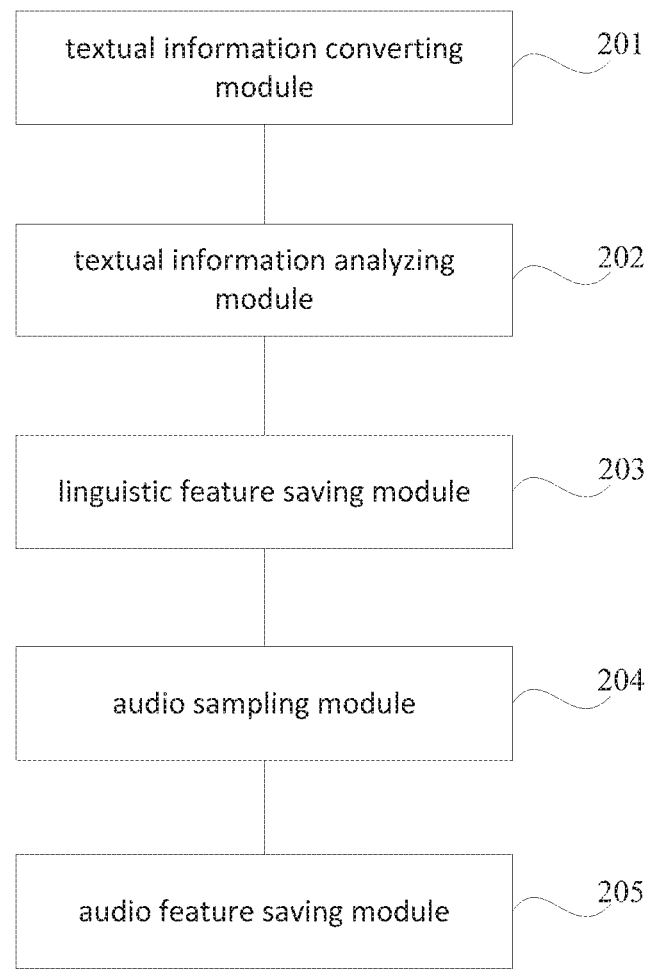
FIG. 2 shows a block diagram of an apparatus for building a speech feature library according to another embodiment of the present invention.

FIG. 2 shows a block diagram of an apparatus for building a speech feature library according to another embodiment of the present invention, hereinafter referred to as a building apparatus.

As shown in FIG. 2, the building apparatus comprises: a module (hereinafter referred to as "text information converting module") 201 configured to convert speech recording of an object into personalized textual information; a module (hereinafter referred to as "textual information analyzing module") 202 configured to analyze and obtain at least one context corresponding to each piece of personalized textual information and at least one semantically identical piece of textual information; a module (hereinafter referred to as "linguistic feature saving module") 203 configured to save, in a speech feature library of the object, each piece of personalized textual information and a corresponding linguistic feature in association, each linguistic feature indicating a context and a piece of textural information that correspond; a module (hereinafter referred to as "audio sampling module") 204 configured to perform audio sampling to the speech recording to obtain an audio sample value; a module (hereinafter referred to as "audio feature saving module") 205 configured to save an audio feature in the speech feature library of the object, the audio feature indicating an audio sample value.

Because the present invention needs to consider scenario information of a user and the user's profile when recommending candidate recommendation items so as to build a speech feature library, for each piece of personalized textual information, at least one context and at least one piece of textual information semantically identical to the piece of personalized textual information will be determined. In subsequent speech synthesis, even the provided textual information is not personalized textual information corresponding to the desired personalized speech, the personalized textual information semantically identical to the textual information that needs to be subject to speech synthesis may be first looked up in the speech feature, and then achieving personalized speech synthesis, such that use of the personalized speech will not be restricted by aging, sickness, and death of a person.

Optionally, there further comprises a module (hereinafter referred to as "speech feature saving module") configured to save the speech feature corresponding to each piece of personalized textual information in the speech feature library, each piece of speech feature indicating a piece of linguistic feature and a piece of audio feature Optionally, each linguistic feature also indicates weights of the corresponding context and textual information in the present piece of linguistic feature.

Optionally, the linguistic feature saving module is specifically configured to:

generate a linguistic feature corresponding to each piece of personalized textual information, and determining weights of the context and textual information indicated by each linguistic feature in the present linguistic feature;

if the context and textual information indicated by the linguistic feature as having been saved in the speech feature library of the object are identical to the context and textual information derived from analysis, but have different weights in the linguistic feature, merge the weights according to a predetermined rule.

Optionally, the audio feature saving module is specifically configured to: if a difference between an audio sampling value indicated by the audio feature already saved in the speech feature library of the object and an audio sampling value derived from audio sampling is within a predetermined range, merge the audio sampling values.

A computer device according to a further embodiment of the present invention comprises an apparatus for building a speech feature library according to any one of the above embodiments.

A speech feature library of an object as built according to the above method at least comprises:

personalized textual information, a linguistic feature associated there with, and an audio feature.

wherein the linguistic feature indicates a context of its corresponding personalized textual information and a piece of textual information semantically identical. Optionally, it also indicates weights of context and textual information.

Here, the audio feature indicates an audio sampling value.

Optionally, the audio feature further comprises a linguistic feature.

Figure 3:
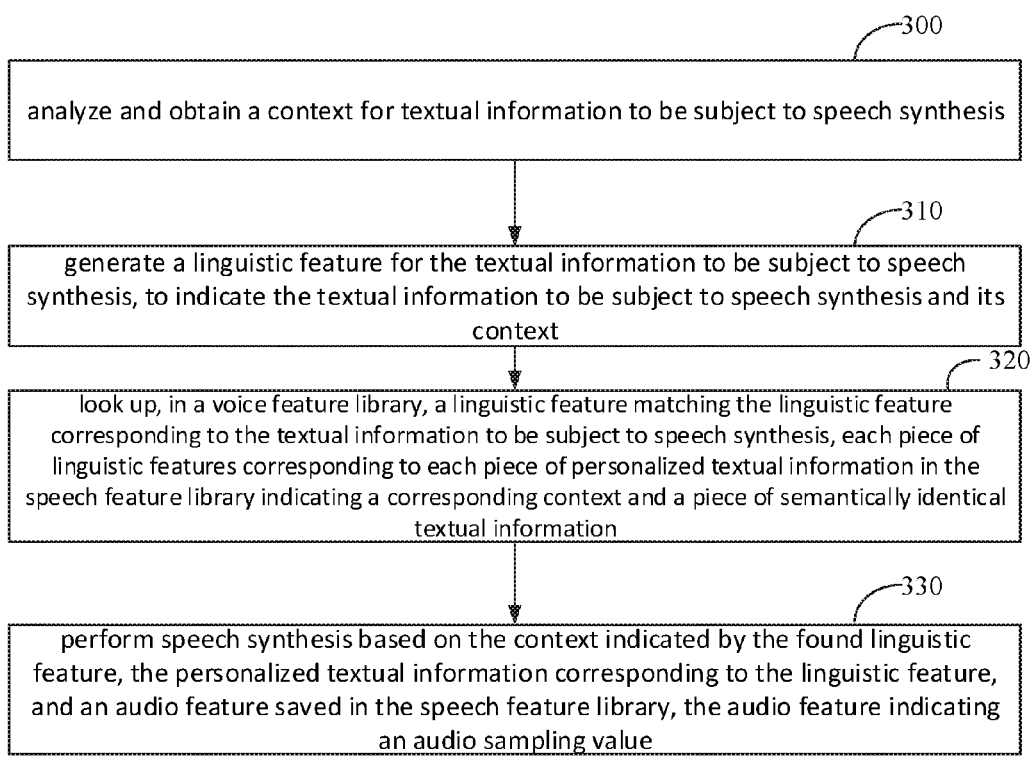
FIG. 3 shows a flow diagram of a speech synthesis method according to one embodiment of the present invention.

Based on the above speech feature library, FIG. 3 shows a flow diagram of a speech synthesis method according to one embodiment of the present invention. The method according to the present invention is mainly implemented by an operating system or a processor control in a computer device. The operating system or processor controller is referred to as an apparatus for building a speech feature library. The computer device includes, but is not limited to, at least one of the following: a user equipment, a network device. The user equipment includes, but is not limited to, a computer, a smart phone, a PDA, etc. The network device, includes, but is not limited to, a single network server, a server group consisting of a plurality of network servers, or a cloud consisting of mass computers or network servers based on cloud computing, wherein the cloud computing a kind of distributed computation, a virtual super computer consisting of a group of loosely coupled computer sets.

As shown in FIG. 3, a speech synthesis method provided by the embodiments of the present invention specifically comprises the following operations:

Step 300, analyzing and obtaining a context for textual information to be subject to speech synthesis.

Here, there are a plurality of specific analysis manners, e.g., analyzing the context and semantics through mass data technology.

Step 310: generating a linguistic feature for the textual information to be subject to speech synthesis, to indicate the textual information to be subject to speech synthesis and its context.

Its specific implementation manner may refer to the above description of the method embodiments, which will not be repetitively detailed here.

Here, each piece of linguistic feature may also indicate weights of the corresponding context and textual information in the present piece of linguistic feature. Its specific implementation may refer to the above depiction of the method embodiments, which will not be detailed here.

If the linguistic feature further indicates weights of the corresponding context and textual information in the present piece of linguistic feature, in step 310, different weights may be configured to generate a group of corresponding linguistic features for the textual information to be subject to speech synthesis. This group of linguistic feature indicates identical context and textual information, except that the weights of the context and contextual information are different.

Step 320: looking up, in a speech feature library, a linguistic feature matching the linguistic feature corresponding to the textual information to be subject to speech synthesis, each piece of linguistic features corresponding to each piece of personalized textual information in the speech feature library indicating a corresponding context and a piece of semantically identical textual information;

Here, if the speech feature library saves speech features, a linguistic feature matching the linguistic feature corresponding to the textual information to be subject to the speech synthesis is looked up based on the speech features saved in the speech feature library. Specifically, each piece of speech feature is looked up, and a corresponding linguistic feature is found based on an indication of the speech feature, and then the found linguistic feature is compared with the linguistic feature corresponding to the textual information to be subject to speech synthesis, thereby determining whether to match.

Here, if the linguistic feature does not indicate weights, the linguistic feature matching refers to both of the context and textual information are identical. If the linguistic feature indicates weights, then the linguistic feature matching refers to both of the context and textual information are identical, and their weights in the textual features are closest.

Step 330: performing speech synthesis based on the context indicated by the found linguistic feature, the personalized textual information corresponding to the linguistic feature, and an audio feature saved in the speech feature library, the audio feature indicating an audio sampling value.

Based on the same inventive concept as the method, the embodiments of the present invention further provide a speech synthesis apparatus.

Figure 4:
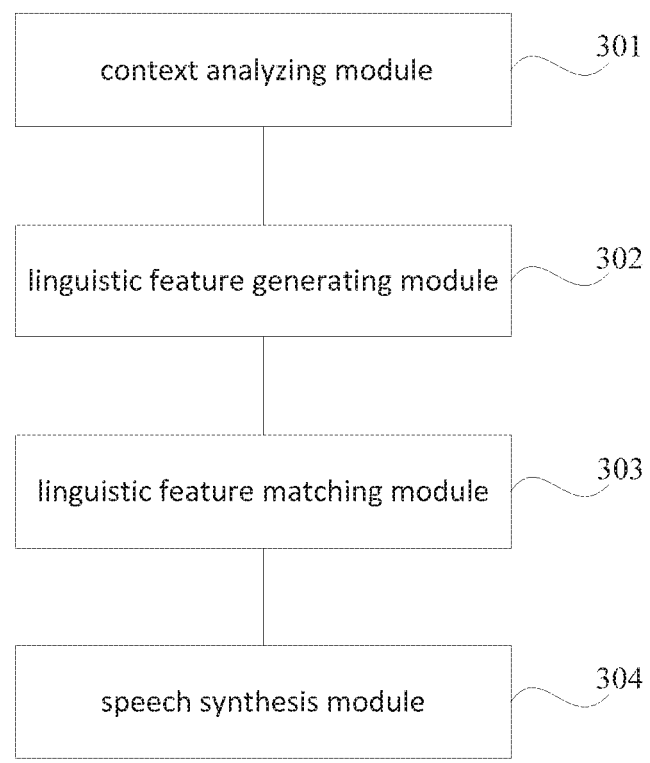
FIG. 4 shows a block diagram of a speech synthesis apparatus according to a further embodiment of the present invention.

FIG. 4 shows a block diagram of a speech synthesis apparatus according to a further embodiment of the present invention, comprising:

a module (hereinafter referred to as "context analyzing module") 401 configured to analyze and obtain a context for textual information to be subject to speech synthesis;

a module (hereinafter referred to as "linguistic feature generating module") 402 configured to generate a linguistic feature for the textual information to be subject to speech synthesis, to indicate the textual information to be subject to speech synthesis and its context;

a module (hereinafter referred to as "linguistic feature matching module") 403 configured to look up, in a speech feature library, a linguistic feature matching the linguistic feature corresponding to the textual information to be subject to speech synthesis, each piece of linguistic features corresponding to each piece of personalized textual information in the speech feature library indicating a corresponding context and a piece of semantically identical textual information;

a module (hereinafter referred to as "speech synthesis module") 404 configured to perform speech synthesis based on the context indicated by the found linguistic feature, the personalized textual information corresponding to the linguistic feature, and an audio feature saved in the speech feature library, the audio feature indicating an audio sampling value.

Because the speech feature library used in the present invention saves at least one context corresponding to each piece of personalized textual information and at least one piece of textual information semantically identical to the personalized textual information, when performing speech synthesis, even if the provided textual information is not personalized textual information corresponding to the desired personalized speech, personalized textual information semantically identical to the textual information to be subject to speech synthesis may be first found in the speech feature library to thereby achieve personalized speech synthesis, such that use of the personalized speech will not be restricted by aging, sickness, and death of a person.

Optionally, the linguistic feature matching module is specifically configured to:

Look up a linguistic feature matching the linguistic feature corresponding to the textual information to be subject to the speech synthesis based on speech features saved in the speech feature library, each speech feature indicating a piece of linguistic feature and a piece of audio feature.

Optionally, each linguistic feature further indicates weights of corresponding context and textual information in the present linguistic feature;

A linguistic feature matching the linguistic feature corresponding to the textual information to be subject to speech synthesis refers to both of the context and textual information are identical, and their weights in the textual features are closest.

A computer device according to a further embodiment of the present invention comprises a speech synthesis apparatus according to any one of the above embodiments.

Those skilled in the art know that the present invention may be implemented as a device, apparatus, method or computer program product. Therefore, the present disclosure may be implemented into the following manners, i.e., complete hardware, complete software, or a combination of hardware and software.

The flow diagrams and block diagrams in the drawings illustrate hierarchical architecture, function, and operation possibly implemented by the system, method, and computer program product according to a plurality of embodiments of the present invention. In this respect, each block in the flow diagrams or block diagrams may represent a module, a part of program segment or code, and the module, the part of program segment, or code including one or more executable instructions for implementing specified logic functions. It should also be noted that in some alternative implementations, the functions annotated in the blocks may occur in an order different from what is annotated in the drawings. For example, two successive blocks actually may be executed substantially in parallel; they may also be executed in a reverse order sometimes, dependent on the functions involved. It should also be noted that each block in the block diagrams/flow diagrams, and a combination of blocks in the block diagrams/flow diagrams may be implemented by a hardware-based dedicated system for executing prescribed functions or operations, or implemented by a combination of dedicated hardware and computer instructions.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims.

The enclosed claims prescribe different aspects of embodiments of the present invention. The following articles are relating to these and other aspects of those embodiments:

Article 1. a method for building a speech feature library, comprising:
  converting speech recording of an object into personalized textual information;
  analyzing and obtaining at least one context corresponding to each piece of personalized textual information and at least one semantically identical piece of textual information;
  saving, in a speech feature library of the object, each piece of personalized textual information and a corresponding linguistic feature in association, each linguistic feature indicating a context and a piece of textural information that correspond;
  performing audio sampling to the speech recording to obtain an audio sample value; and
  saving an audio feature in the speech feature library of the object, the audio feature indicating an audio sample value.

Article 2. the method according to article 1, further comprising:
  saving a speech feature corresponding to each piece of personalized textual information in the speech feature library, each speech feature indicating a piece of linguistic feature and a piece of audio feature.

Article 3. the method according to article 1 or 2, wherein each piece of linguistic feature further indicates weights of the corresponding context and textual information in the present linguistic feature.

Article 4. the method according to article 3, wherein the step of saving, in a speech feature library of the object, each piece of personalized textual information and a corresponding linguistic feature in association comprises:
  generating a linguistic feature corresponding to each piece of personalized textual information, and determining weights of the context and textual information indicated by each linguistic feature in the present linguistic feature; and
  if the context and textual information indicated by the linguistic feature as having been saved in the speech feature library of the object are identical to the context and textual information derived from analysis, but have different weights in the linguistic feature, merging the weights according to a predetermined rule.

Article 5. the method according to article 1 or 2, wherein the step of saving an audio feature in the speech feature library of the object comprises:
  if a difference between an audio sampling value indicated by the audio feature already saved in the speech feature library of the object and an audio sampling value derived from audio sampling is within a predetermined range, merging the audio sampling values.

Article 6. a speech synthesis method, comprising:
  analyzing and obtaining a context for textual information to be subject to speech synthesis;
  generating a linguistic feature for the textual information to be subject to speech synthesis,
  to indicate the textual information to be subject to speech synthesis and its context;
  looking up, in a speech feature library, a linguistic feature matching the linguistic feature corresponding to the textual information to be subject to speech synthesis, each piece of linguistic features corresponding to each piece of personalized textual information in the speech feature library indicating a corresponding context and a piece of semantically identical textual information; and
  performing speech synthesis based on the context indicated by the found linguistic feature, the personalized textual information corresponding to the linguistic feature, and an audio feature saved in the speech feature library, the audio feature indicating an audio sampling value.

Article 7. the speech synthesis method according to article 6, wherein the step of looking up, in a speech feature library, a linguistic feature matching the linguistic feature corresponding to the textual information to be subject to speech synthesis comprises:
  looking up a linguistic feature matching the linguistic feature corresponding to the textual information to be subject to the speech synthesis based on speech features saved in the speech feature library, each piece of speech feature indicating a piece of linguistic feature and a piece of audio feature.

Article 8. the speech synthesis method according to article 6 or 7, wherein each linguistic feature further indicates weights of corresponding context and textual information in the present linguistic feature; and a linguistic feature matching the linguistic feature corresponding to the textual information to be subject to speech synthesis refers to both of the context and textual information are identical, and their weights in the textual features are closest.

Article 9. an apparatus for building a speech feature library, comprising:
 a module configured to convert speech recording of an object into personalized textual information;
 a module configured to analyze and obtain at least one context corresponding to each piece of personalized textual information and at least one semantically identical piece of textual information;
 a module configured to save, in a speech feature library of the object, each piece of personalized textual information and a corresponding linguistic feature in association, each linguistic feature indicating a context and a piece of textural information that correspond;
 a module configured to perform audio sampling to the speech recording to obtain an audio sample value; and
 a module configured to save an audio feature in the speech feature library of the object, the audio feature indicating an audio sample value.

Article 10. the apparatus according to article 9, further comprising: a module configured to save a speech feature corresponding to each piece of personalized textual information in the speech feature library, each speech feature indicating a piece of linguistic feature and a piece of audio feature.

Article 11. the apparatus according to article 9 or 10, wherein each piece of linguistic feature further indicates weights of the corresponding context and textual information in the present linguistic feature.

Article 12. the apparatus according to article 11, wherein the module configured to save, in a speech feature library of the object, each piece of personalized textual information and a corresponding linguistic feature in association is specifically configured to:
 generate a linguistic feature corresponding to each piece of personalized textual information, and determining weights of the context and textual information indicated by each linguistic feature in the present linguistic feature; and
 if the context and textual information indicated by the linguistic feature as having been saved in the speech feature library of the object are identical to the context and textual information derived from analysis, but have different weights in the linguistic feature, merge the weights according to a predetermined rule Article 13. the apparatus according to article 9 or 10, wherein the module configured to save an audio feature in the speech feature library of the object is specifically configured to:
 if a difference between an audio sampling value indicated by the audio feature already saved in the speech feature library of the object and an audio sampling value derived from audio sampling is within a predetermined range, merge the audio sampling values.

Article 14. a computer device, comprising an apparatus for building a speech feature library according to any one of articles 9-13.

Article 15. a speech synthesis apparatus, comprising:
 a module configured to analyze and obtain a context for textual information to be subject to speech synthesis;
 a module configured to generate a linguistic feature for the textual information to be subject to speech synthesis, to indicate the textual information to be subject to speech synthesis and its context;
 a module configured to look up, in a speech feature library, a linguistic feature matching the linguistic feature corresponding to the textual information to be subject to speech synthesis, each piece of linguistic features corresponding to each piece of personalized textual information in the speech feature library indicating a corresponding context and a piece of semantically identical textual information; and
 a module configured to perform speech synthesis based on the context indicated by the found linguistic feature, the personalized textual information corresponding to the linguistic feature, and an audio feature saved in the speech feature library, the audio feature indicating an audio sampling value.

Article 16. the speech synthesis apparatus according to article 15 wherein the module configured to look up, in a speech feature library, a linguistic feature matching the linguistic feature corresponding to the textual information to be subject to speech synthesis is specifically configured to:
look up a linguistic feature matching the linguistic feature corresponding to the textual information to be subject to the speech synthesis based on speech features saved in the speech feature library, each piece of speech feature indicating a piece of linguistic feature and a piece of audio feature.

Article 17. the speech synthesis apparatus according to article 15 or 16, wherein each linguistic feature further indicates weights of corresponding context and textual information in the present linguistic feature;
a linguistic feature matching the linguistic feature corresponding to the textual information to be subject to speech synthesis refers to both of the context and textual information are identical, and their weights in the textual features are closest.

Article 18. a computer device, comprising an apparatus for building a speech feature library according to any one of articles 15-17.

Article 19. a non-transitory computer readable storage media that stores computer code which, when executed, performs the method according to article 1.

Article 20. a non-transitory computer readable storage media that stores computer code which, when executed, performs the method according to article 6.

The invention claimed is:

1. A method for building a speech feature library, comprising:
 converting speech recording of a person into textual information;
 obtaining at least one context corresponding to each piece of the textual information and at least one semantically identical piece of the textual information;
 saving, in a speech feature library of the person, each piece of textual information and a corresponding linguistic feature which indicates the context of each piece of textual information;

performing audio sampling to the speech recording to obtain an audio sample value; and saving an audio feature in the speech feature library of the person, the audio feature indicating the obtained audio sample value;

wherein each piece of linguistic feature further indicates weight of the corresponding context and weight of the corresponding textual information in the linguistic feature; and wherein the step of saving, in the speech feature library of the person, each piece of textual information and its corresponding linguistic feature comprises:

for each piece of textual information, generating its corresponding linguistic feature, and determining a weight of the textual information and a weight of the context indicated by the linguistic feature; and if the context indicated by the linguistic feature is identical to a context indicated by a linguistic feature previously stored in the speech feature library of the person but the two contexts have different weights, and if the textual information indicated by the linguistic feature is identical to a textual information indicated by a previously stored linguistic feature, but the two pieces of textual information have different weights, merging the weights of the two contexts and merging the weights of the two pieces of textual information.

2. The method according to claim 1, wherein the step of saving an audio feature in the speech feature library of the person comprises:

if a difference between an audio sampling value indicated by the audio feature already saved in the speech feature library of the person and an audio sampling value derived from audio sampling is within a predetermined range, merging the audio sampling values.

3. The method according to claim 1, further comprising: receiving new textual information;

obtaining a new linguistic feature corresponding to the context by analyzing the new textual information; and converting the new textual information into a speech signal by looking-up the audio feature from the speech feature library using the new linguistic feature.

4. An apparatus for building a speech feature library, comprising:

a module configured to convert speech recording of a person into textual information;

a module configured to analyze each piece of textual information to obtain at least one context corresponding to each piece of textual information and at least one semantically identical piece of textual information;

a module configured to save, in a speech feature library of the person, each piece of textual information and a corresponding linguistic feature which indicates the context of each piece of textual information;

a module configured to perform audio sampling to the speech recording to obtain an audio sample value; and a module configured to save an audio feature in the speech feature library of the person, the audio feature indicating the obtained audio sample value;

wherein each piece of linguistic feature further indicates weight of the corresponding context and weight of the corresponding textual information in the linguistic feature; and wherein the module configured to save, in the speech feature library of the person, each piece of textual information and corresponding linguistic feature is specifically configured to:

for each piece of textual information, generate its corresponding linguistic feature, and determine a weight of the textual information and a weight of the context indicated by the linguistic feature; and if the context indicated by the linguistic feature is identical to a context indicated by a linguistic feature previously stored in the speech feature library of the person, but the two contexts have different weights, and if the textual information indicated by the linguistic feature is identical to a textual information indicated by a previously stored linguistic feature in the speech feature library of the person, but the two pieces of textual information have different weights, merge the weights of the two contexts and merging the weights of the two pieces of textual information.

5. The apparatus according to claim 4, wherein the module configured to save an audio feature in the speech feature library of the person is specifically configured to: if a difference between an audio sampling value indicated by the audio feature already saved in the speech feature library of the person and an audio sampling value derived from audio sampling is within a predetermined range, merge the audio sampling values.

6. The apparatus according to claim 4, further comprising:

a module configured to receive new textual information;

a module configured to obtain a new linguistic feature corresponding to the context by analyzing the new textual information; and a module configured to convert the new textual information into a speech signal by looking-up the audio feature from the speech feature library using the new linguistic feature.

7. A non-transitory computer readable storage media that stores computer code which, when executed, performs the method according to claim 1.

* * * * *